(12) United States Patent
Porlick et al.

(10) Patent No.: US 9,194,321 B1
(45) Date of Patent: Nov. 24, 2015

(54) SYSTEM AND METHOD FOR DIAGNOSING A FAULT IN A CAMSHAFT POSITION SENSOR AND/OR A CRANKSHAFT POSITION SENSOR

(71) Applicant: GM Global Technology Operations LLC, Detroit, MI (US)

(72) Inventors: Thomas F. Porlick, Brighton, MI (US); Kevin A. Sherwin, Farmington Hills, MI (US); Layne K. Wiggins, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/469,907

(22) Filed: Aug. 27, 2014

(51) Int. Cl.
*F02D 41/22* (2006.01)
*F02D 41/00* (2006.01)
*F02D 41/26* (2006.01)

(52) U.S. Cl.
CPC ............ *F02D 41/222* (2013.01); *F02D 41/009* (2013.01); *F02D 41/22* (2013.01); *F02D 41/263* (2013.01)

(58) Field of Classification Search
CPC ... F02D 41/009; F02D 41/222; F02D 41/263; F02D 41/22
See application file for complete search history.

(56) References Cited

U.S. PATENT DOCUMENTS 6,675,772 B1 * 1/2004 Mingo et al. .................. 701/114
2013/0092114 A1 * 4/2013 Pietsch et al. .............. 123/90.17

* cited by examiner

*Primary Examiner* — Thomas Tarcza
*Assistant Examiner* — Kevin Myhre

(57) ABSTRACT

A system according to the principles of the present disclosure includes a starter control module, an engine speed module, and a sensor diagnostic module. The starter control module generates a starter engage signal to engage a starter of an engine. The engine speed module determines a speed of the engine based on input from at least one of a camshaft position sensor and a crankshaft position sensor. The sensor diagnostic module selectively diagnoses a fault in the at least one of the camshaft position sensor and the crankshaft position sensor based on a rate of change in the engine speed before the starter engage signal is generated.

20 Claims, 3 Drawing Sheets

SYSTEM AND METHOD FOR DIAGNOSING A FAULT IN A CAMSHAFT POSITION SENSOR AND/OR A CRANKSHAFT POSITION SENSOR

FIELD

The present disclosure relates to internal combustion engines, and more specifically, to systems and methods for diagnosing a fault in a camshaft position sensor and/or a crankshaft position sensor.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a starter control module, an engine speed module, and a sensor diagnostic module. The starter control module generates a starter engage signal to engage a starter of an engine. The engine speed module determines a speed of the engine based on input from at least one of a camshaft position sensor and a crankshaft position sensor. The sensor diagnostic module selectively diagnoses a fault in the at least one of the camshaft position sensor and the crankshaft position sensor based on a rate of change in the engine speed before the starter engage signal is generated.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control system typically ensures that the engine is moving before delivering fuel to cylinders of the engine. The system determines whether the engine is moving based on a signal from a position sensor such as a camshaft position sensor or a crankshaft position sensor. In some cases, due to noise in the signal from the position sensor, the system may determine that the engine is moving when the engine is actually not moving. In these cases, the system may deliver fuel to cylinders of the engine when the engine is not running. In turn, the engine may be damaged due to hydrolock, a condition in which the amount of fluid accumulated in a cylinder is greater than the smallest volume of a combustion chamber corresponding to the cylinder.

In addition, an engine control system typically does not engage a starter when an engine is moving to avoid damaging the starter. Thus, if noise in the signal from the position sensor causes the system to determine that the engine is moving when the engine is actually not moving, the system may inhibit starter engagement without setting a diagnostic trouble code. In turn, a driver may be unable to start the engine, and a service technician may be unable to identify the cause of the issue.

A system and method according to the present disclosure prevents these scenarios by diagnosing a fault in the position sensor when the signal from the position sensor exhibits irrational behavior. In one example, the system and method determines an engine speed based on the signal from the position sensor and determines that the signal exhibits irrational behavior when a rate of change in the engine speed is greater than a predetermined rate. In this manner, the system and method distinguishes irrational behavior due to signal noise from unexpected but acceptable engine behavior, such as engine behavior that may occur as a result of a push start.

Figure 1:
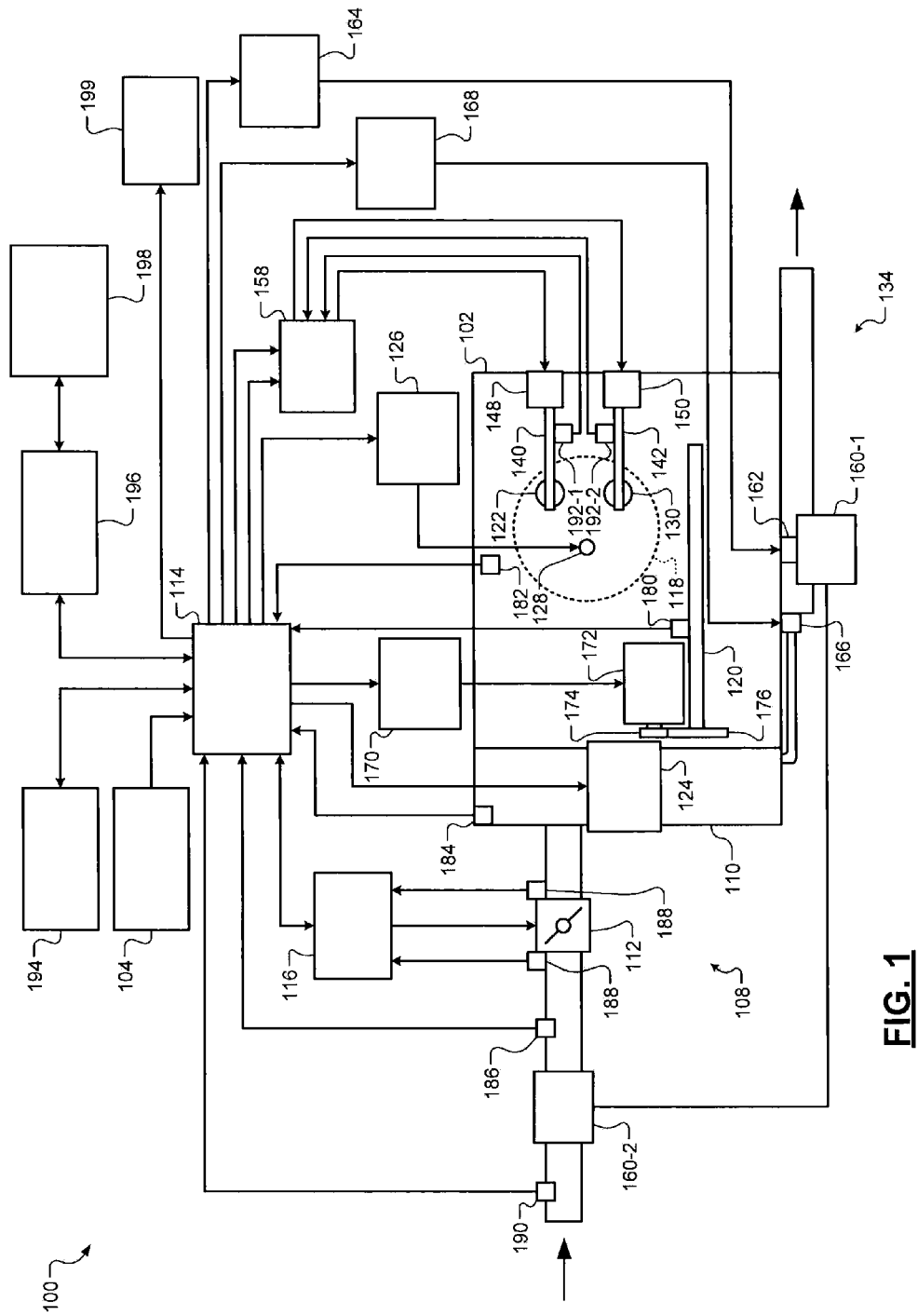
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal, a position of a brake pedal, and/or a position of an ignition switch. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148 and 150 based on signals from the ECM 114. When implemented, variable valve lift may also be controlled by the valve actuator module 158.

The ECM 114 may deactivate the cylinder 118 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may control the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft 120, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 166, which selectively redirects exhaust gas back to the intake manifold 110. The EGR valve 166 may be located upstream of the turbocharger's turbine 160-1. The EGR valve 166 may be controlled by an EGR actuator module 168.

The ECM 114 controls a starter actuator module 170, which selectively engages a starter 172 to rotate the crankshaft 120 and thereby start the engine 102. The starter actuator module 170 may engage the starter 172 by engaging a drive pinion 174 of the starter 172 with a flywheel 176 coupled to the crankshaft 120. The starter actuator module 170 may also supply power to a motor in the starter 172 that is coupled to the drive pinion 174 to rotate the motor and thereby rotate the crankshaft 120.

The engine system 100 may measure the position of the crankshaft 120 using a crankshaft position (CKP) sensor 180.

The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 188. The ambient temperature of air being drawn into the engine 102 may be measured using an intake air temperature (IAT) sensor 190. The positions of the intake and exhaust camshafts 140 and 142 may be measured using intake and exhaust camshaft position (CMP) sensors 192-1 and 192-2. The CMP sensors 192-1 and 192-2 may output the camshaft positions to the valve actuator module 158 and the valve actuator module 158 may output the camshaft positions to the ECM 114, as shown in FIG. 1. Alternatively, the CMP sensors 192-1 and 192-2 may output the camshaft positions directly to the ECM 114. The ECM 114 uses signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by the vehicle's electrical systems and/or for storage in a battery. In various implementations, various functions of the ECM 114, the TCM 194, and the HCM 196 may be integrated into one or more modules.

Before the ECM 114 engages the starter 172 to start the engine 102, the ECM 114 determines a speed of the engine 102 based on an input from the CKP sensor 180, the CMP sensor 192-1, and/or the CMP sensor 192-2. The ECM 114 diagnoses a fault in the sensor(s) whose input is used to determine the engine speed based on a rate of change in the engine speed before the starter 172 engages. The ECM 114 may set a diagnostic trouble code (DTC) and/or activate a service indicator 199 when a fault in the CKP sensor 180, the CMP sensor 192-1, and/or the CMP sensor 192-2 is diagnosed. When activated, the service indicator 199 indicates that service is required using a visual message (e.g., text, a light, and/or a symbol), an audible message (e.g., a chime), and/or a tactile message (e.g., vibration).

Figure 2:
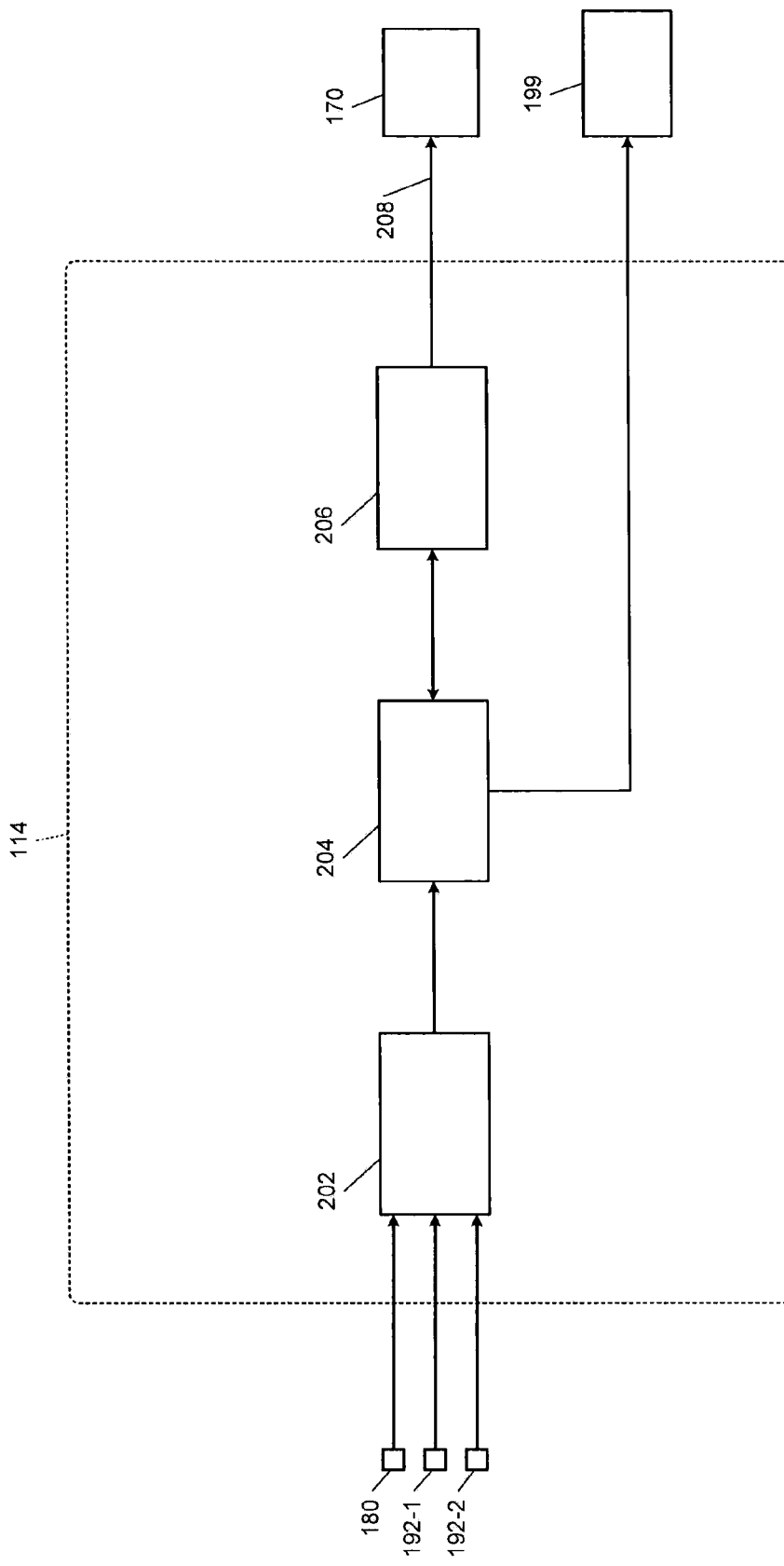
FIG. 2 is a functional block diagram of an example control system according to the principles of the present disclosure.

Referring now to FIG. 2, an example implementation of the ECM 114 includes an engine speed module 202, a sensor diagnostic module 204, and a starter control module 206. The engine speed module 202 determines the speed of the engine 102. The engine speed module 202 may determine the engine speed based on the crankshaft position from the CKP sensor 180. For example, the engine speed module 202 may calculate the engine speed based on a period that elapses as the crankshaft 120 completes one or more revolutions.

Additionally or alternatively, the engine speed module 202 may determine the engine speed based on the intake camshaft position from the intake CMP sensor 192-1. For example, the engine speed module 202 may calculate the engine speed based on a period that elapses as the intake camshaft 140 completes one or more revolutions. Additionally or alternatively, the engine speed module 202 may determine the engine speed based on the exhaust camshaft position from the exhaust CMP sensor 192-2. For example, the engine speed module 202 may calculate the engine speed based on a period that elapses as the exhaust camshaft 142 completes one or more revolutions. The engine speed module 202 outputs the engine speed.

The starter control module 206 generates a starter engage signal 208 to engage the starter 172 based on the driver input and/or engine operating conditions. The starter control module 206 may generate the starter engage signal 208 when a driver adjusts an ignition switch to a crank position. The starter control module 206 may also generate the starter engage signal 208 when the driver releases the brake pedal or depresses the accelerator pedal to automatically restart the engine 102 after the engine 102 is automatically stopped. In addition, after an automatic stop, the starter control module 206 may generate the starter engage signal 208 when the driver takes certain actions or when certain engine operating conditions do not meet predetermined criteria for the automatic stop. For example, the starter control module 206 may generate the starter engage signal 208 when the driver opens a hood of the vehicle. In another example, the starter control module 206 may generate the starter engage signal 208 when a battery state of charge is less than a predetermined value or when the engine coolant temperature is greater than a predetermined temperature. The starter control module 206 outputs the starter engage signal 208 to the starter actuator module 170. In response, the starter actuator module 170 engages the starter 172.

The sensor diagnostic module 204 selectively diagnoses a fault in the CKP sensor 180, the intake CMP sensor 192-1, and/or the exhaust CMP sensor 192-2 based on a rate of change in the engine speed before the starter engage signal 208 is generated. The sensor diagnostic module 204 may diagnose a fault in the one(s) of the sensors 180, 192-1, and 192-2 whose input(s) is used to determine the engine speed (i.e., the one(s) of the sensors 180, 192-1, and 192-2 that is being evaluated). The sensor diagnostic module 204 may determine the rate of change in the engine speed. Alternatively, the engine speed module 202 may determine the rate of change in the engine speed and output the rate of change in the engine speed to the sensor diagnostic module 204.

Figure 3:
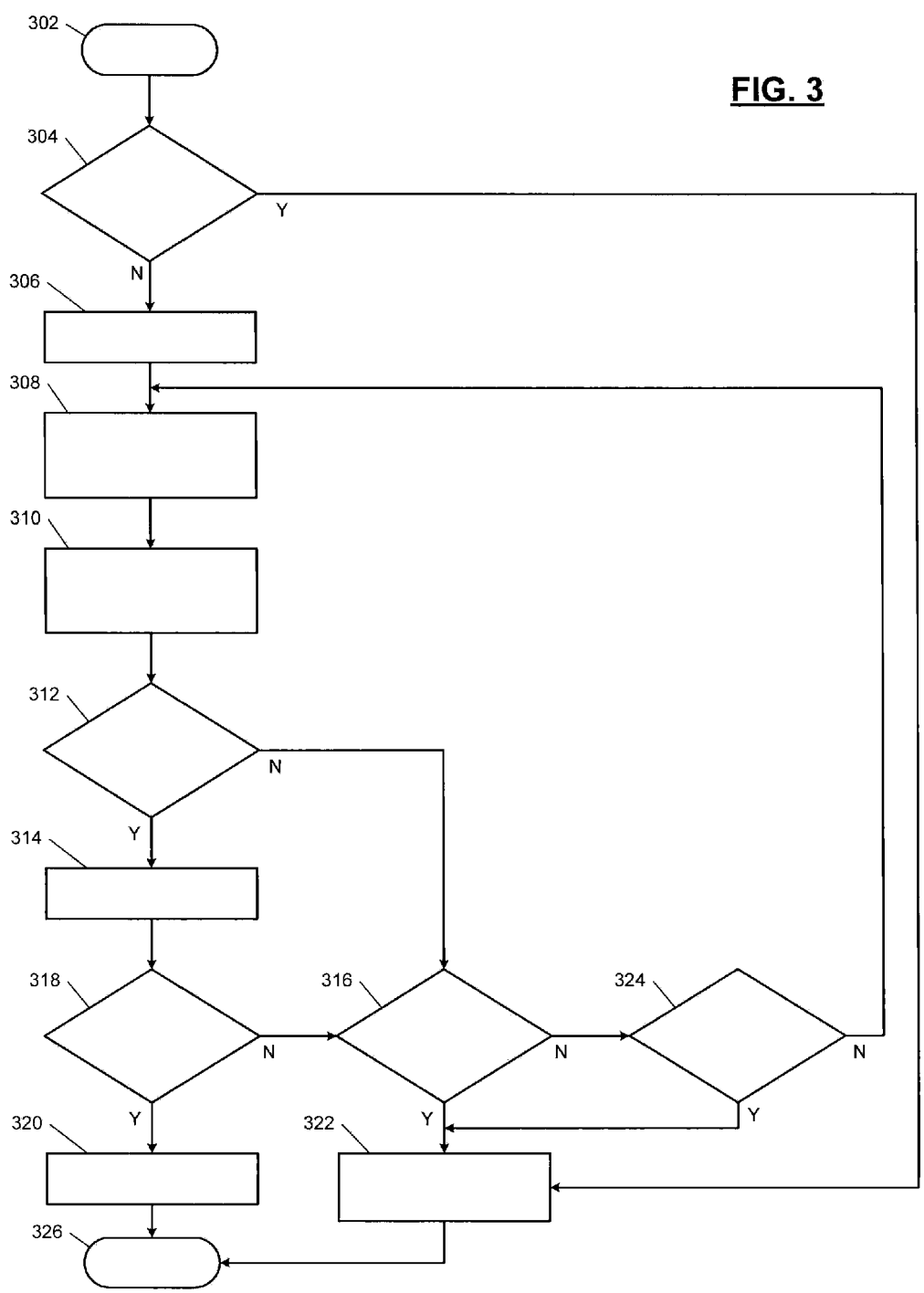
FIG. 3 is a flowchart illustrating an example control method according to the principles of the present disclosure.

Referring now to FIG. 3, a method of diagnosing a fault in a camshaft position sensor and/or a crankshaft position sensor begins at 302. The method is described in the context of the modules included in the example implementation of the ECM 114 shown in FIG. 2 in order to further describe the functions performed by those modules. However, the particular modules that perform the steps of the method may be different than the description below and/or the method may be implemented apart from the modules of FIG. 2. For example, the method may be implemented by a single module.

The ECM 114 may begin executing the method at 302 when the engine 102 is not running and before the starter engage signal 308 is generated. When the engine 102 is not running because the driver switched the ignition switch to an off position, the ECM 114 may begin executing the method at 302 when the ECM 114 is initialized, which may occur when power is initially supplied to the ECM 114. Power may be initially supplied to the ECM 114 when the driver switches the ignition switch to an on position or the crank position, or when a door of the vehicle is unlocked or opened. When the engine 102 is not running due to an automatic stop, the ECM 114 may begin executing the method at 302 as soon as the engine 102 is stopped.

At 304, the sensor diagnostic module 204 determines whether the starter engage signal 208 is generated. The sensor diagnostic module 204 may determine whether the starter engage signal 208 is generated based on an input received from the starter control module 206. If the starter engage signal 208 is generated, the sensor diagnostic module 204 continues at 322. Otherwise, the sensor diagnostic module 204 continues at 306.

At 306, the sensor diagnostic module 204 starts a timer. At 308, the engine speed module 202 determines the engine speed. The engine speed module 202 may determine the engine speed based on an input from the CKP sensor 180, the intake CMP sensor 192-1, and/or the exhaust CMP sensor 192-2 as described above with reference to FIG. 2. The engine speed module 202 may determine the engine speed based on an input from the one(s) of the CKP sensor 180, the intake CMP sensor 192-1, and the exhaust CMP sensor 192-2 that is being evaluated.

At 310, the sensor diagnostic module 204 determines a change in the engine speed during a first period. The first period may have a first predetermined duration (e.g., 12.5 milliseconds). For example, the engine speed module 202 may determine the engine speed at predetermined times, and the first period may be equal to the amount of time between the predetermined times. The change in the engine speed may be a total amount of change in the engine speed over the first period, in which case the period of the change in the engine speed may be equal to the first period. Alternatively, the change in the engine speed may be a maximum absolute change in the engine speed during the first period, in which case the period of the change in the engine speed may be less than or equal to the first period.

At 312, the sensor diagnostic module 204 determines whether the change in the engine speed is greater than a predetermined amount (e.g., 1000 revolutions per minute). When the change in the engine speed is greater than the predetermined amount, the sensor diagnostic module 204 continues at 314 and increments a counter (e.g., increases the counter by one) corresponding to the one(s) of the CKP sensor 180, the intake CMP sensor 192-1, and the exhaust CMP sensor 192-2 that is being evaluated. Otherwise, the sensor diagnostic module 204 continues at 316.

At 318, the sensor diagnostic module 204 determines whether the counter is greater than or equal to a predetermined count (e.g., 4). If the counter is greater than or equal to the predetermined count, the sensor diagnostic module 204 continues at 320. Otherwise, the sensor diagnostic module 204 continues at 316. At 320, the sensor diagnostic module 204 diagnoses a fault in the one(s) of the sensors 180, 192-1, and 192-2 that is being evaluated.

At 316, the sensor diagnostic module 204 determines whether the starter engage signal 308 is generated. The sensor diagnostic module 204 may determine whether the starter engage signal 308 is generated based on an input from the starter control module 206. If the starter engage signal 308 is generated, the method continues at 322. Otherwise, the sensor diagnostic module 204 continues at 324. At 322, the sensor diagnostic module 204 does not diagnose a fault in the one(s) of the sensors 180, 192-1, and 192-2 that is being evaluated. In addition, the sensor diagnostic module 204 may reset the counter and/or the timer to zero.

At 324, the sensor diagnostic module 204 determines whether the timer is greater than or equal to a second period. The second period may begin when the timer is started at 306 and may have a second predetermined duration (e.g., 4 seconds). If the timer is greater than or equal to the second period, the sensor diagnostic module 204 continues at 322. Otherwise, the method continues at 308. The method ends at 326.

In the discussion above, the sensor diagnostic module 204 determines a change in the engine speed during the first period and diagnoses a fault in the sensor used to determine the engine speed based on the change in the engine speed. Alternatively, the sensor diagnostic module 204 may determine a rate of change in the engine speed by dividing a change in the engine speed by a corresponding period, and diagnose a fault in the sensor based on the rate of change in the engine speed. For example, the sensor diagnostic module 204 may diagnose a fault in the sensor when the rate of change in the engine speed is greater than a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   a starter control module that generates a starter engage signal to engage a starter of an engine;
   an engine speed module that determines a speed of the engine based on input from at least one of a camshaft position sensor and a crankshaft position sensor; and
   a sensor diagnostic module that selectively diagnoses a fault in the at least one of the camshaft position sensor and the crankshaft position sensor based on a rate of change in the engine speed before the starter engage signal is generated.

2. The system of claim 1 wherein the sensor diagnostic module selectively diagnoses a fault in the at least one of the camshaft position sensor and the crankshaft position sensor when a change in the engine speed during a first period is greater than a predetermined amount.

3. The system of claim 2 wherein the sensor diagnostic module:
   increments a counter during a second period when the change in the engine speed is greater than the predetermined amount; and
   diagnoses a fault in the at least one of the camshaft position sensor and the crankshaft position sensor when the corresponding counter is greater than or equal to a predetermined count during the second period.

4. The system of claim 3 wherein the second period begins when the engine is stopped and before the starter engage signal is generated.

5. The system of claim 4 wherein the first period has a first predetermined duration and the second period has a second predetermined duration.

6. The system of claim 5 wherein the sensor diagnostic module resets the counter to zero when the second period ends.

7. The system of claim 5 wherein the sensor diagnostic module does not diagnose a fault in the at least one of the camshaft position sensor and the crankshaft position sensor when the starter engages before the second period ends.

8. The system of claim 5 wherein the sensor diagnostic module does not diagnose a fault in the at least one of the camshaft position sensor and the crankshaft position sensor when the starter engages before the counter increases to a value that is greater than or equal to the predetermined count during the second period.

9. The system of claim 1 wherein the starter control module generates the starter engage signal to engage the starter when a driver adjusts an ignition switch to a crank position.

10. The system of claim 1 wherein the starter control module generates the starter engage signal to engage the starter based on at least one of (i) a driver input and (ii) an engine operating condition.

11. A method comprising:
    generating a starter engage signal to engage a starter of an engine;
    determining a speed of the engine based on input from at least one of a camshaft position sensor and a crankshaft position sensor; and
    selectively diagnosing a fault in the at least one of the camshaft position sensor and the crankshaft position sensor based on a rate of change in the engine speed before the starter engage signal is generated.

12. The method of claim 11 further comprising selectively diagnosing a fault in the at least one of the camshaft position sensor and the crankshaft position sensor when a change in the engine speed during a first period is greater than a predetermined amount.

13. The method of claim 12 further comprising:
    incrementing a counter during a second period when the change in the engine speed is greater than the predetermined amount; and
    diagnosing a fault in the at least one of the camshaft position sensor and the crankshaft position sensor when the corresponding counter is greater than or equal to a predetermined count during the second period.

14. The method of claim 13 wherein the second period begins when the engine is stopped and before the starter engage signal is generated.

15. The method of claim 14 wherein the first period has a first predetermined duration and the second period has a second predetermined duration.

16. The method of claim 15 further comprising resetting the counter to zero when the second period ends.

17. The method of claim 15 further comprising not diagnosing a fault in the at least one of the camshaft position sensor and the crankshaft position sensor when the starter engages before the second period ends.

18. The method of claim 15 further comprising not diagnosing a fault in the at least one of the camshaft position sensor and the crankshaft position sensor when the starter engages before the counter increases to a value that is greater than or equal to the predetermined count during the second period.

19. The method of claim 11 further comprising generating the starter engage signal to engage the starter when a driver adjusts an ignition switch to a crank position.

20. The method of claim 11 further comprising generating the starter engage signal to engage the starter based on at least one of (i) a driver input and (ii) an engine operating condition.

* * * * *